(12) United States Patent
Mahbub et al.

(10) Patent No.: US 12,009,478 B1
(45) Date of Patent: Jun. 11, 2024

(54) SOLID STATE ELECTROLYTE

(71) Applicant: Rivian IP Holdings, LLC, Irvine, CA (US)

(72) Inventors: Rubayyat Mahbub, Fremont, CA (US); Chen Chen, Newark, CA (US); Hui Dong, Santa Clara, CA (US); Sonika Rajput, San Jose, CA (US); Thomas Andrew Wynn, San Carlos, CA (US); Forrest Stephen Gittleson, Mountain View, CA (US); Shyam Dwaraknath, San Ramon, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/358,865

(22) Filed: Jul. 25, 2023

(51) Int. Cl.
*H01M 10/0562* (2010.01)
*H01M 4/02* (2006.01)
*H01M 4/04* (2006.01)
*H01M 4/485* (2010.01)
*H01M 4/58* (2010.01)

(52) U.S. Cl.
CPC ..... *H01M 10/0562* (2013.01); *H01M 4/0404* (2013.01); *H01M 4/485* (2013.01); *H01M 4/5825* (2013.01); *H01M 2004/027* (2013.01); *H01M 2004/028* (2013.01); *H01M 2220/20* (2013.01); *H01M 2300/008* (2013.01)

(58) Field of Classification Search
None
See application file for complete search history.

(56) References Cited

U.S. PATENT DOCUMENTS

| | | | |
|---|---|---|---|
| 6,168,884 B1 * | 1/2001 | Neudecker | H01M 10/0436 429/231.95 |
| 11,444,317 B2 | 9/2022 | Utsuno et al. | |
| 2005/0079418 A1 * | 4/2005 | Kelley | C23C 14/562 29/623.1 |
| 2013/0040208 A1 * | 2/2013 | Kanno | H01M 10/0562 429/321 |
| 2016/0261000 A1 * | 9/2016 | Zhang | H01M 10/0568 |
| 2019/0140313 A1 * | 5/2019 | Terai | H01M 10/0525 |
| 2022/0069301 A1 * | 3/2022 | Yun | H01M 10/0562 |

FOREIGN PATENT DOCUMENTS

| | | | | |
|---|---|---|---|---|
| CN | 113471521 A | * | 10/2021 | |
| CN | 114744287 A | * | 7/2022 | |
| EP | 3893308 A1 | * | 10/2021 | C01D 15/00 |
| KR | 102228383 B1 | * | 3/2021 | |

OTHER PUBLICATIONS

Adeli et al. "Boosting Solid-State Diffusivity and Conductivity in Lithium Superionic Argyrodites by Halide Substitution" Angew. Chem. Int. Ed. 2019, 58, 8681-8686 (Year: 2019).*
Zhou "Synthesis and Characterization of New Solid-State Li-Superionic Conductors", A thesis presented to the University of Waterloo—Master of Science in Chemistry-Nanotechnology, 99 pages (Year: 2017).*
Yu et al. "Recent development of lithium argyrodite solid-state electrolytes for solid-state batteries: Synthesis, structure, stability and dynamics"; Nano Energy 83 105858, pp. 1-25 (Year: 2021).*
Www.espacenet.com machine translation of CN 114744287A. (Year: 2022).*
Www.espacenet.com machine translation of KR102228383B1 (Year: 2020).*
Www.espacenet.com abstract of CN-113471521-A (Year: 2).*
Www.espacenet.com translation of CN-113471521-A (Year: 2).*
Www.espacenet.com abstract of CN-114744287-A (Year: 2).*
Www.espacenet.com translation of CN-114744287-A (Year: 2).*
Ward et al., "Matminer: An Open Source Toolkit for Materials Data Mining," Computational Materials Science, 2018, 152, 20 pages.
Zhang et al. "Design and Synthesis of Room Temperature Stable Li-Argyrodite Superionic Conductors via Cation Doping." Journal of Materials Chemistry A 7.6 (2019): 2717-2722.

* cited by examiner

*Primary Examiner* — Gregg Cantelmo
(74) *Attorney, Agent, or Firm* — BAKERHOSTETLER

(57) ABSTRACT

Aspects of the disclosure relate to solid state electrolytes which include a composition of $Li_6PS_5Cl$ having a dopant substituted, in part, for phosphorus (P-site dopant) and an excess molar amount of Cl (i.e., doped, off-stoichiometric compositions). The P-site dopant can be selected among Groups 4, 5, 14, or 15 of the periodic table of elements and has an ionic radius greater than phosphorus (P). Such solid state electrolytes can be used in all solid-state batteries and configured for use in electric vehicles.

8 Claims, 11 Drawing Sheets

SOLID STATE ELECTROLYTE

INTRODUCTION

The present disclosure generally relates to electrolytes in solid form for use in battery cells. Battery cells are often used to store and discharge electrical energy.

Aspects of the subject technology can help improve the operation and implementation of battery cells. For example, battery cells having solid state electrolytes of the present disclosure can improve safety, power density, and energy density compared with batteries that use a liquid electrolyte. Such all solid state batteries enhance efficiency and utilization of batteries, which can help to mitigate climate change by reducing and/or preventing additional greenhouse gas emissions.

SUMMARY

The present disclosure generally relates to argyrodite-based compositions of $Li_6PS_5Cl$ (LPSC) that are phosphorus-site doped (P-site doped) and include an excess molar amount of chlorine (Cl). Such P-site doped and off-stoichiometric argyrodite-based compositions can be used in an all-solid-state battery and can have high ionic conductivity with adequate chemical and electrochemical stability relative to the base $Li_6PS_5Cl$ composition. For example, the P-site doped and off-stoichiometric argyrodite-based compositions may include a P-site dopant having an ionic radius greater than phosphorus (P) and selected among Groups 4, 5, 14, or 15 of the periodic table of elements, or any combination thereof. Such P-site dopants include, without limitation: Sn, Si, Zr, Ti, Sb, Bi, V, Nb, Ta, or a combination thereof. The compositions may include an excess amount of Cl, e.g., more than one mole of Cl such as greater than one mole to less than or equal to two moles of Cl.

In some aspects, solid-state electrolyte of the present disclosure may include a composition of Formula (I): $Li_xP_{(1-y)}A_yS_{6-z}Cl_{1+z}$ (I). In Formula (I), A is a P-site dopant selected among Group 4, 5, 14, or 15 of the periodic table, or a combination thereof. Further, the variables x, y and z can have ranges of: $4.5 < x < 7$; $0 < y < 1$; and $0 < z < 1$.

In accordance with one or more aspects of the disclosure, a battery cell can include a solid-state electrolyte of the present disclosure. The battery cell may further include a positive electrode having a cathode active material and may further include a negative electrode having an anode active material. Alternatively, or in combination, the negative electrode can include a current collector (e.g., a metal foil such as a copper foil or carbon foil) with an in situ-formed anode (e.g., Li metal) on a surface of the current collector facing the solid-state electrolyte.

In one or more implementations, a battery cell having an active material as described herein may be included in a building and/or movable apparatus, e.g., a vehicle. For example, such a battery cell may be configured to power a component or system of a building and/or a vehicle.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

As discussed in further detail hereinafter, a battery cell composed of a solid state electrolyte of the present disclosure may be used to store and discharge electrical energy. A battery cell of the present disclosure can be used alone or multiple battery cells can be assembled or packaged together in the same housing, frame, or casing to form a battery subassembly, module and/or battery pack. Further, multiple battery subassemblies or modules can be assembled or packaged together to form a battery pack. The battery cells of a battery subassembly, module and/or pack can be electrically connected to generate a desired voltage output for the battery subassembly, module and/or pack. The battery subassembly, module and/or pack in turn can be electrically connected to a power-consuming component, such as a vehicle and/or an electrical system of a building.

Vehicles, Battery Packs, Battery Cells

Figure 1A:
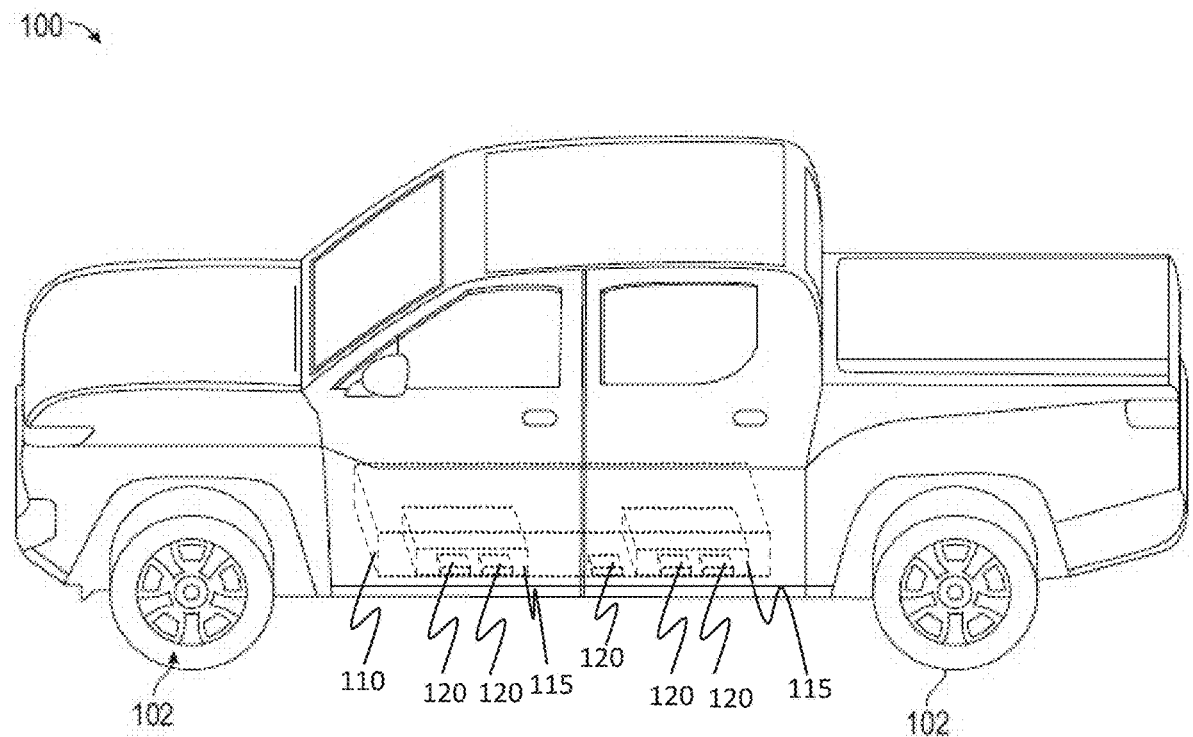
FIGS. 1A and 1B illustrate schematic perspective side views of example implementations of a vehicle having a battery pack in accordance with one or more implementations.

FIG. 1A is a diagram illustrating an example implementation of a moveable apparatus as described herein. In the example of FIG. 1A, a moveable apparatus is implemented as a vehicle 100. As shown, the vehicle 100 may include one or more battery packs, such as battery pack 110. The battery pack 110 may be coupled to one or more electrical systems of the vehicle 100 to provide power to the electrical systems.

In one or more implementations, the vehicle 100 may be an electric vehicle having one or more electric motors that drive the wheels 102 of the vehicle using electric power from the battery pack 110. In one or more implementations, the vehicle 100 may also, or alternatively, include one or more chemically-powered engines, such as a gas-powered engine or a fuel cell powered motor. For example, electric vehicles can be fully electric or partially electric (e.g., hybrid or plug-in hybrid). In various implementations, the vehicle 100 may be a fully autonomous vehicle that can navigate roadways without a human operator or driver, a partially autonomous vehicle that can navigate some roadways without a human operator or driver or that can navigate roadways with the supervision of a human operator, may be an unmanned vehicle that can navigate roadways or other pathways without any human occupants, or may be a human operated (non-autonomous) vehicle configured for a human operator.

In the example of FIG. 1A, the vehicle 100 is implemented as a truck (e.g., a pickup truck) having a battery pack 110. As shown, the battery pack 110 may include one or more battery modules 115, which may include one or more battery cells 120. As shown in FIG. 1A, the battery pack 110 may also, or alternatively, include one or more battery cells 120 mounted directly in the battery pack 110 (e.g., in a cell-to-pack configuration). In one or more implementations, the battery pack 110 may be provided without any battery modules 115 and with the battery cells 120 mounted directly in the battery pack 110 (e.g., in a cell-to-pack configuration) and/or in other battery units that are installed in the battery pack 110. A vehicle battery pack can include multiple energy storage devices that can be arranged into such as battery modules or battery units. A battery unit or module can include an assembly of cells that can be combined with other elements (e.g., structural frame, thermal management devices) that can protect the assembly of cells from heat, shock and/or vibrations.

For example, the battery cell 120 can be included as a battery, a battery unit, a battery module and/or a battery pack to power components of the vehicle 100. For example, a battery cell housing of the battery cell 120 can be disposed in the battery module 115, the battery pack 110, a battery array, or other battery unit installed in the vehicle 100.

As discussed in further detail hereinafter, the battery cells 120 may be provided with a battery cell housing that can be provided with any of various outer shapes. The battery cell housing may be a rigid housing in some implementations (e.g., for cylindrical or prismatic battery cells). The battery cell housing may also, or alternatively, be formed as a pouch or other flexible or malleable housing for the battery cell in some implementations. In various other implementations, the battery cell housing can be provided with any other suitable outer shape, such as a triangular outer shape, a square outer shape, a rectangular outer shape, a pentagonal outer shape, a hexagonal outer shape, or any other suitable outer shape. In some implementations, the battery pack 110 may not include modules (e.g., the battery pack may be module-free). For example, the battery pack 110 can have a module-free or cell-to-pack configuration in which the battery cells 120 are arranged directly into the battery pack 110 without assembly into a battery module 115. In one or more implementations, the vehicle 100 may include one or more busbars, electrical connectors, or other charge collecting, current collecting, and/or coupling components to provide electrical power from the battery pack 110 to various systems or components of the vehicle 100. In one or more implementations, the vehicle 100 may include control circuitry such as a power stage circuit that can be used to convert DC power from the battery pack 110 into AC power for one or more components and/or systems of the vehicle (e.g., including one or more power outlets of the vehicle and/or the motor(s) that drive the wheels 102 of the vehicle). The power stage circuit can be provided as part of the battery pack 110 or separately from the battery pack 110 within the vehicle 100.

Figure 1B:
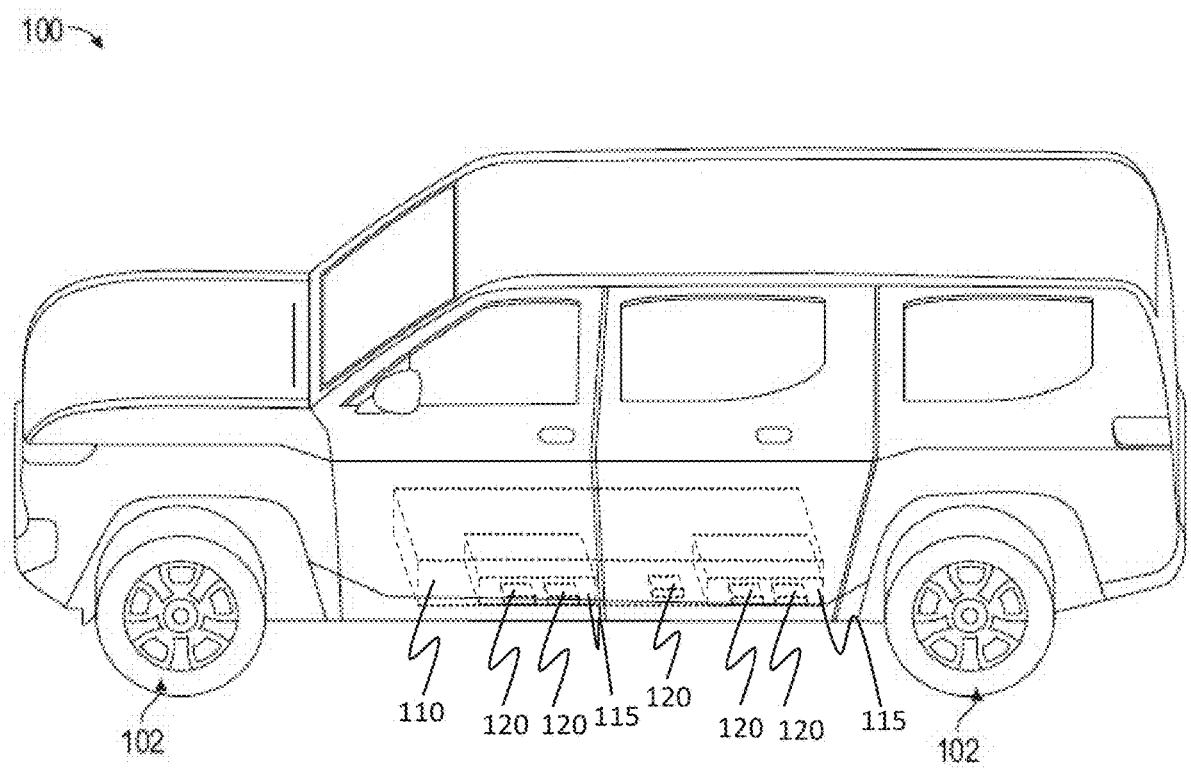

The example of FIG. 1A in which the vehicle 100 is implemented as a pickup truck having a truck bed at the rear portion thereof is merely illustrative. For example, FIG. 1B illustrates another implementation in which the vehicle 100 including the battery pack 110 is implemented as a sport utility vehicle (SUV), such as an electric sport utility vehicle. In the example of FIG. 1B, the vehicle 100 including the battery pack 110 may include a cargo storage area that is enclosed within the vehicle 100 (e.g., behind a row of seats within a cabin of the vehicle). In other implementations, the vehicle 100 may be implemented as another type of electric truck, an electric delivery van, an electric automobile, an electric car, an electric motorcycle, an electric scooter, an electric bicycle, an electric passenger vehicle, an electric passenger or commercial truck, a hybrid vehicle, an aircraft, a watercraft, and/or any other movable apparatus having a battery pack 110 (e.g., a battery pack or other battery unit that powers the propulsion or drive components of the moveable apparatus).

Figure 1C:
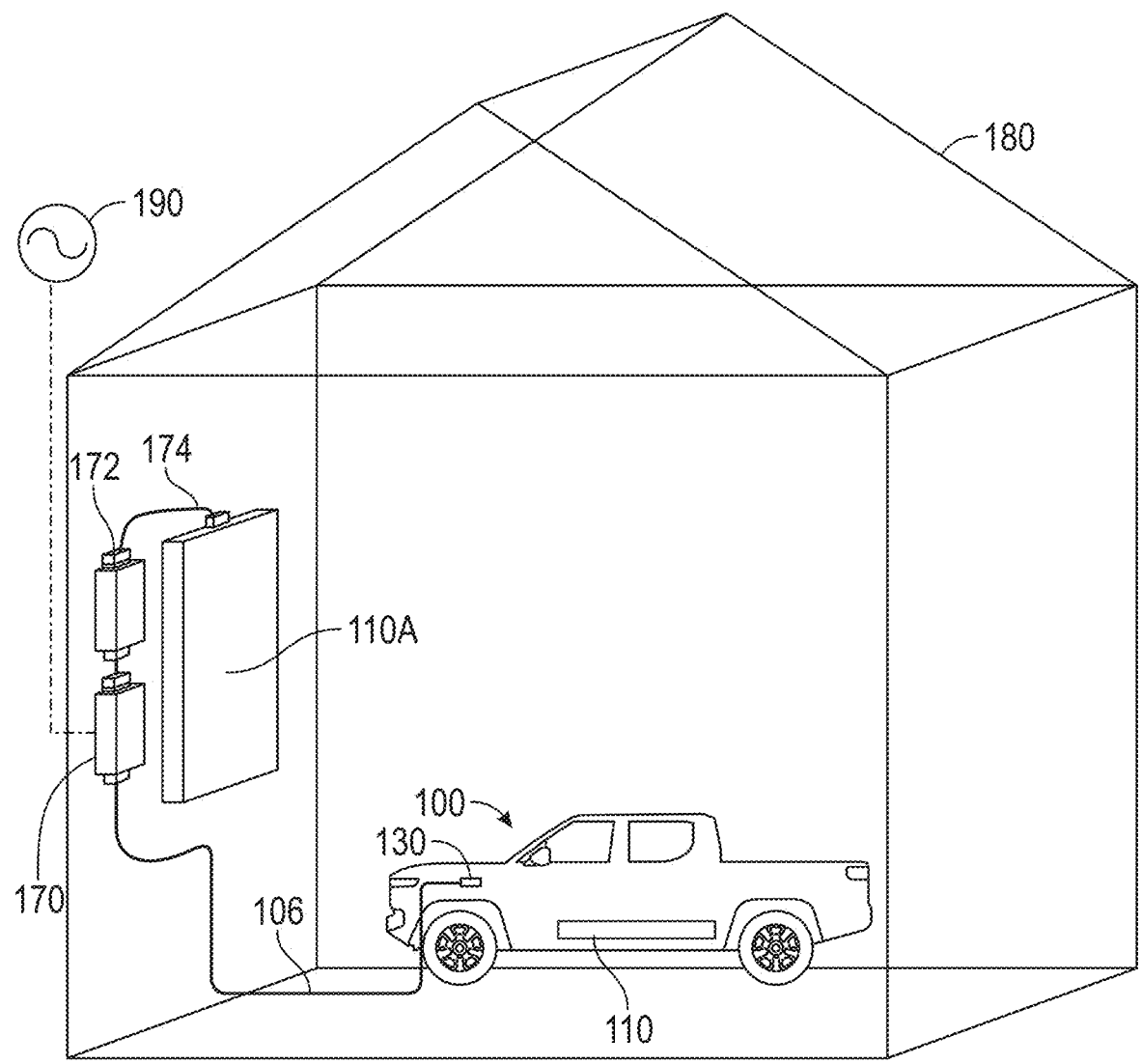
FIG. 1C illustrates a schematic perspective view of a building having a battery pack in accordance with one or more implementations.

In one or more implementations, a battery pack such as the battery pack 110, a battery module 115, a battery cell 120, and/or any other battery unit as described herein may also, or alternatively, be implemented as an electrical power supply and/or energy storage system in a building, such as a residential home or commercial building. For example, FIG. 1C illustrates an example in which a battery pack 110 is implemented in a building 180. For example, the building 180 may be a residential building, a commercial building, or any other building. As shown, in one or more implementations, a battery pack 110 may be mounted to a wall of the building 180.

As shown, the battery 110A that is installed in the building 180 may be couplable to the battery pack 110 in the vehicle 100, such as via: a cable/connector 106 that can be connected to the charging port 130 of the vehicle 100, electric vehicle supply equipment 170 (EVSE), a power stage circuit 172, and/or a cable/connector 174. For example, the cable/connector 106 may be coupled to the EVSE 170, which may be coupled to the battery 110A via the power stage circuit 172, and/or may be coupled to an external power source 190. In this way, either the external power source 190 or the battery 110A that is installed in the building 180 may be used as an external power source to charge the battery pack 110 in the vehicle 100 in some use cases. In some examples, the battery 110A that is installed in the building 180 may also, or alternatively, be coupled (e.g., via a cable/connector 174, the power stage circuit 172, and the EVSE 170) to the external power source 190. For example, the external power source 190 may be a solar power source, a wind power source, and/or an electrical grid of a city, town, or other geographic region (e.g., electrical grid that is powered by a remote power plant). During, for example, times when the battery pack 110 in the vehicle 100 is not coupled to the battery 110A that is installed in the building 180, the battery 110A that is installed in the building 180 can be coupled (e.g., using the power stage circuit 172 for the building 180) to the external power source 190 to charge up and store electrical energy. In some use cases, this stored electrical energy in the battery 110A that is installed in the building 180 can later be used to charge the battery pack 110 in the vehicle 100 (e.g., during times when solar power or wind power is not available, in the case of a regional or local power outage for the building 180, and/or during a period of high rates for access to the electrical grid).

In one or more implementations, the power stage circuit 172 may electrically couple the battery 110A that is installed in the building 180 to an electrical system of the building 180. For example, the power stage circuit 172 may convert DC power from the battery 110A into AC power for one or more loads in the building 180. For example, the battery 110A that is installed in the building 180 may be used to power one or more lights, lamps, appliances, fans, heaters, air conditioners, and/or any other electrical components or electrical loads in the building 180 (e.g., via one or more electrical outlets that are coupled to the battery 110A that is installed in the building 180). For example, the power stage circuit 172 may include control circuitry that is operable to switchably couple the battery 110A between the external power source 190 and one or more electrical outlets and/or other electrical loads in the electrical system of the building 180. In one or more implementations, the vehicle 100 may include a power stage circuit (not shown in FIG. 1C) that can be used to convert power received from the electric vehicle supply equipment 170 to DC power that is used to power/charge the battery pack 110 of the vehicle 100, and/or to convert DC power from the battery pack 110 into AC power for one or more electrical systems, components, and/or loads of the vehicle 100.

In one or more use cases, the battery 110A that is installed in the building 180 may be used as a source of electrical power for the building 180, such as during times when solar power or wind power is not available, in the case of a regional or local power outage for the building 180, and/or during a period of high rates for access to the electrical grid (as examples). In one or more other use cases, the battery pack 110 that is installed in the vehicle may be used to charge the battery 110A that is installed in the building 180 and/or to power the electrical system of the building 180 (e.g., in a use case in which the battery 110A that is installed in the building 180 is low on or out of stored energy and in which solar power or wind power is not available, a regional or local power outage occurs for the building 180, and/or a period of high rates for access to the electrical grid occurs (as examples)).

Figure 2A:
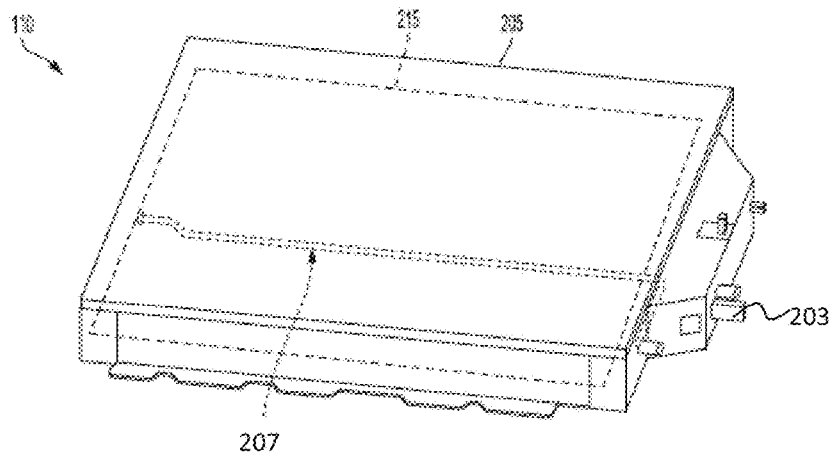
FIG. 2A illustrates a schematic perspective view of a battery pack in accordance with one or more implementations.

FIG. 2A depicts an example battery pack 110. Battery pack 110 may include multiple battery cells 120 (e.g., directly installed within the battery pack 110, or within batteries, battery units, and/or battery subassemblies) and/or battery modules 115, and one or more conductive coupling elements for coupling a voltage generated by the battery cells 120 to a power-consuming component, such as the vehicle 100 and/or an electrical system of a building 180. For example, the conductive coupling elements may include internal connectors and/or contactors that couple together multiple battery cells 120, battery units, batteries, and/or multiple battery modules 115 within the battery pack frame 205 to generate a desired output voltage for the battery pack 110. The battery pack 110 may also include one or more external connection ports, such as an electrical contact 203 (e.g., a high voltage terminal). For example, an electrical cable (e.g., cable/connector 106) may be connected between the electrical contact 203 and an electrical system of the vehicle 100 or the building 180, to provide electrical power to the vehicle 100 or the building 180.

As shown, the battery pack 110 may include a battery pack frame 205 (e.g., a battery pack housing or pack frame). For example, the battery pack frame 205 may house or enclose one or more battery modules 115 and/or one or more battery cells 120, and/or other battery pack components. In one or more implementations, the battery pack frame 205 may include or form a shielding structure on an outer surface thereof (e.g., a bottom thereof and/or underneath one or more battery module 115, battery units, batteries, and/or battery cells 120) to protect the battery module 115, battery units, batteries, and/or battery cells 120 from external conditions (e.g., if the battery pack 110 is installed in a vehicle 100 and the vehicle 100 is driven over rough terrain, such as off-road terrain, trenches, rocks, rivers, streams, etc.).

In one or more implementations, the battery pack 110 may include one or more thermal control structures 207 (e.g., cooling lines and/or plates and/or heating lines and/or plates). For example, thermal control structures 207 may couple thermal control structures and/or fluids to the battery modules 115, battery units, batteries, and/or battery cells 120 within the battery pack frame 205, such as by distributing fluid through the battery pack 110.

For example, the thermal control structures 207 may form a part of a thermal/temperature control or heat exchange system that includes one or more thermal components 215 such as plates or bladders that are disposed in thermal contact with one or more battery modules 115 and/or battery cells 120 disposed within the battery pack frame 205. For example, a thermal component 215 may be positioned in contact with one or more battery modules 115, battery units, batteries, and/or battery cells 120 within the battery pack frame 205. In one or more implementations, the battery pack 110 may include one or multiple thermal control structures 207 and/or other thermal components for each of several top and bottom battery module pairs. As shown, the battery pack 110 may include an electrical contact 203 (e.g., a high voltage connector) by which an external load (e.g., the vehicle 100 or an electrical system of the building 180) may be electrically coupled to the battery modules and/or battery cells in the battery pack 110.

Figure 2B:
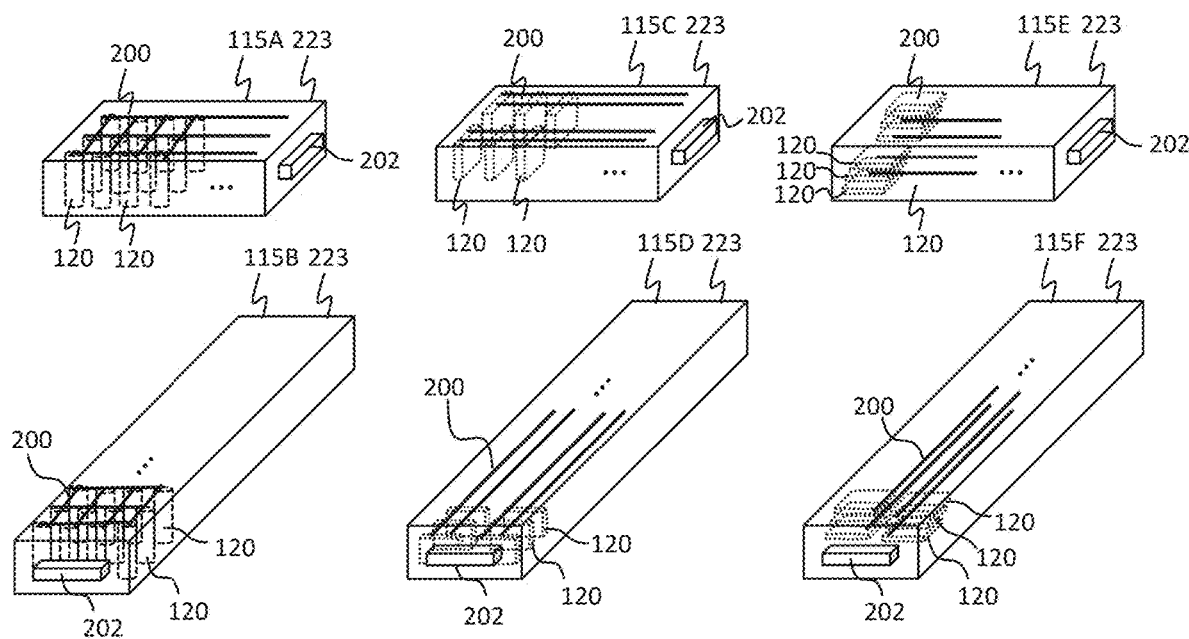
FIG. 2B illustrates schematic perspective views of various battery modules that may be included in a battery pack in accordance with one or more implementations.

FIG. 2B depicts various examples of battery subassemblies (e.g. modules 115) that may be disposed in the battery pack 110 (e.g., within the battery pack frame 205 of FIG. 2A). In the example of FIG. 2B, a battery module 115A is shown that includes a battery module housing 223 having a rectangular cuboid shape with a length that is substantially similar to its width. In this example, the battery module 115A includes multiple battery cells 120 implemented as cylindrical battery cells. In this example, the battery module 115A includes rows and columns of cylindrical battery cells that are coupled together by an interconnect structure 200 (e.g., a current connector assembly or CCA). For example, the interconnect structure 200 may couple together the positive terminals of the battery cells 120, and/or couple together the negative battery terminals of the battery cells 120. As shown, the battery module 115A may include a charge collector or bus bar 202. For example, the bus bar 202 may be electrically coupled to the interconnect structure 200 to collect the charge generated by the battery cells 120 to provide a high voltage output from the battery module 115A.

FIG. 2B also shows a battery module 115B having an elongate shape, in which the length of the battery module housing 223 (e.g., extending along a direction from a front end of the battery pack 110 to a rear end of the battery pack 110 when the battery module 115B is installed in the battery pack 110) is substantially greater than a width (e.g., in a transverse direction to the direction from the front end of the battery pack 110 to the rear end of the battery pack 110 when the battery module 115B is installed in the battery pack 110) of the battery module housing 223. For example, one or more battery modules 115B may span the entire front-to-back length of a battery pack within the battery pack frame 205. As shown, the battery module 115B may also include a bus bar 202 electrically coupled to the interconnect structure 200. For example, the bus bar 202 may be electrically coupled to the interconnect structure 200 to collect the charge generated by the battery cells 120 to provide a high voltage output from the battery module 115B.

In the implementations of battery module 115A and battery module 115B, the battery cells 120 are implemented as cylindrical battery cells. However, in other implementations, a battery module may include battery cells having other form factors, such as a battery cells having a right prismatic outer shape (e.g., a prismatic cell), or a pouch cell implementation of a battery cell. As an example, FIG. 2B also shows a battery module 115C having a battery module housing 223 having a rectangular cuboid shape with a length that is substantially similar to its width and including multiple battery cells 120 implemented as prismatic battery cells. In this example, the battery module 115C includes rows and columns of prismatic battery cells that are coupled together by an interconnect structure 200 (e.g., a current collector assembly or CCA). For example, the interconnect structure 200 may couple together the positive terminals of the battery cells 120 and/or couple together the negative battery terminals of the battery cells 120. As shown, the battery module 115C may include a charge collector or bus bar 202. For example, the bus bar 202 may be electrically coupled to the interconnect structure 200 to collect the charge generated by the battery cells 120 to provide a high voltage output from the battery module 115C.

FIG. 2B also shows a battery module 115D including prismatic battery cells and having an elongate shape, in which the length of the battery module housing 223 (e.g., extending along a direction from a front end of the battery pack 110 to a rear end of the battery pack 110 when the battery module 115D is installed in the battery pack 110) is substantially greater than a width (e.g., in a transverse direction to the direction from the front end of the battery pack 110 to the rear end of the battery pack 110 when the battery module 115D is installed in the battery pack 110) of the battery module housing 223. For example, one or more battery modules 115D having prismatic battery cells may span the entire front-to-back length of a battery pack within the battery pack frame 205. As shown, the battery module 115D may also include a bus bar 202 electrically coupled to the interconnect structure 200. For example, the bus bar 202 may be electrically coupled to the interconnect structure 200 to collect the charge generated by the battery cells 120 to provide a high voltage output from the battery module 115D.

As another example, FIG. 2B also shows a battery module 115E having a battery module housing 223 having a rectangular cuboid shape with a length that is substantially similar to its width and including multiple battery cells 120 implemented as pouch battery cells. In this example, the battery module 115C includes rows and columns of pouch battery cells that are coupled together by an interconnect structure 200 (e.g., a current collector assembly or CCA). For example, the interconnect structure 200 may couple together the positive terminals of the battery cells 120 and couple together the negative battery terminals of the battery cells 120. As shown, the battery module 115E may include a charge collector or bus bar 202. For example, the bus bar 202 may be electrically coupled to the interconnect structure 200 to collect the charge generated by the battery cells 120 to provide a high voltage output from the battery module 115E.

FIG. 2B also shows a battery module 115F including pouch battery cells and having an elongate shape in which the length of the battery module housing 223 (e.g., extending along a direction from a front end of the battery pack 110 to a rear end of the battery pack 110 when the battery module 115E is installed in the battery pack 110) is substantially greater than a width (e.g., in a transverse direction to the direction from the front end of the battery pack 110 to the rear end of the battery pack 110 when the battery module 115E is installed in the battery pack 110) of the battery module housing 223. For example, one or more battery modules 115E having pouch battery cells may span the entire front-to-back length of a battery pack within the battery pack frame 205. As shown, the battery module 115E may also include a bus bar 202 electrically coupled to the interconnect structure 200. For example, the bus bar 202 may be electrically coupled to the interconnect structure 200 to collect the charge generated by the battery cells 120 to provide a high voltage output from the battery module 115E.

In various implementations, a battery pack 110 may be provided with one or more of any of the battery modules 115A, 115B, 115C, 115D, 115E, and 115F. In one or more other implementations, a battery pack 110 may be provided without battery modules 115 (e.g., in a cell-to-pack implementation).

In one or more implementations, multiple battery modules 115 in any of the implementations of FIG. 2B may be coupled (e.g., in series) to a current collector of the battery pack 110. In one or more implementations, the current collector may be coupled, via a high voltage harness, to one or more external connectors (e.g., electrical contact 203) on the battery pack 110. In one or more implementations, the battery pack 110 may be provided without any battery modules 115. For example, the battery pack 110 may have a cell-to-pack configuration in which battery cells 120 are arranged directly into the battery pack 110 without assembly into a battery module 115 (e.g., without including a separate battery module housing 223). For example, the battery pack 110 (e.g., the battery pack frame 205) may include or define a plurality of structures for positioning of the battery cells 120 directly within the battery pack frame 205.

Figure 2C:
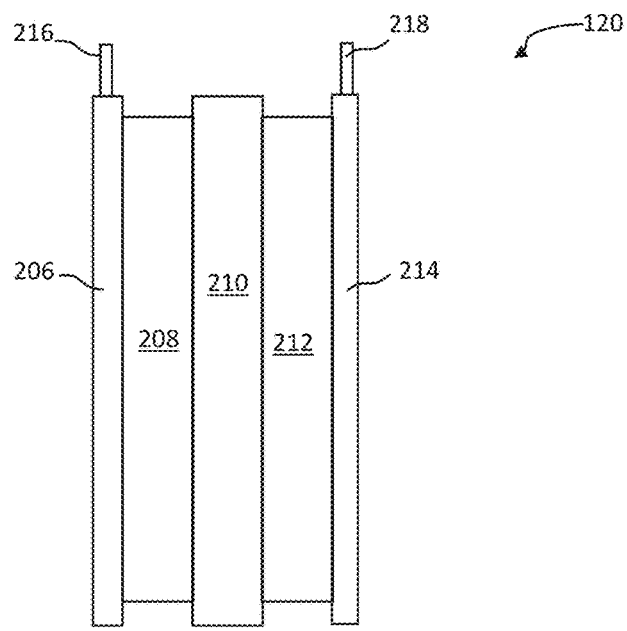
FIG. 2C illustrates a cross-sectional end view of a battery cell in accordance with one or more implementations.

FIG. 2C illustrates a cross-sectional end view of a portion of a battery cell 120. As shown in FIG. 2C, a battery cell 120 may include an anode 208, a cathode 212 and a solid electrolyte (210) according to the present disclosure, which separates the anode and cathode. As shown, the anode 208 may include or be electrically coupled to a first current collector 206 (e.g., a metal layer such as a layer of copper foil or other metal foil). As shown, the cathode 212 may include or be electrically coupled to a second current collector 214 (e.g., a metal layer such as a layer of aluminum foil or other metal foil). As shown, the battery cell 120 may include a first terminal 216 (e.g., a negative terminal) coupled to the anode 208 (e.g., via the first current collector 206) and a second terminal 218 (e.g., a positive terminal) coupled to the cathode (e.g., via the second current collector 214).

In one or more implementations, the battery cell 120 may be implemented as a lithium ion battery cell in which the anode 208 is formed from a carbonaceous material (e.g., graphite or silicon-carbon). In these implementations, lithium ions can move from the anode 208 and the electrolyte 210 to the cathode 212 during discharge of the battery cell 120 and from the cathode 212 and the electrolyte 210 to the anode 208 during charging of the battery cell 120. For example, the anode 208 may be formed from a graphite material that is coated on a copper foil corresponding to the first current collector 206. In these lithium ion implementations, the cathode 212 may be formed from one or more metal oxides (e.g., a lithium cobalt oxide, a lithium manganese oxide, a lithium nickel manganese cobalt oxide (NMC), or the like) and/or a lithium metal phosphate such as a lithium iron phosphate, lithium manganese phosphate, etc. or combinations thereof. As shown, solid electrolyte layer 210 may prevent contact between the anode 208 and the cathode 212, and may be permeable to ions. In one or more implementations, the battery cell 120 may be implemented as a lithium polymer battery cell having a solid-state electrolyte of the present disclosure.

The battery cell 120 may be implemented as a lithium metal battery cell. In such implementations, the anode 208 may be formed at least in part from lithium and the cathode 212 may be formed from active materials as formed in lithium ion cells together with a solid electrolyte 210 of the present disclosure. In other implementations, the battery cell 120 may be a lithium sulfur battery in which the anode 208 may be formed at least in part from lithium, the cathode 212 may be formed from at least in part form sulfur, and the electrolyte 210 may be formed at least in part from a solid-state electrolyte of the present disclosure.

Figure 2D:
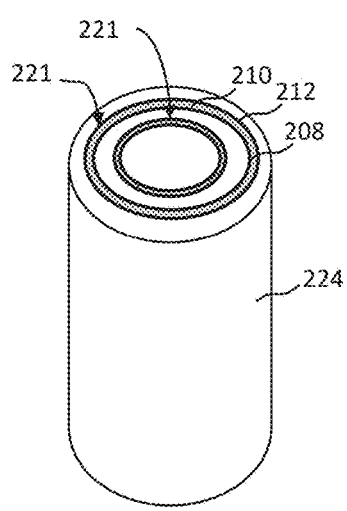
FIG. 2D illustrates a cross-sectional perspective view of a cylindrical battery cell in accordance with one or more implementations.

In various implementations, the anode 208, the solid electrolyte 210, and the cathode 212 of FIG. 2C can be packaged into a battery cell housing having any of various shapes, and/or sizes, and/or formed from any of various suitable materials. For example, battery cells 120 can have a cylindrical, rectangular, square, cubic, flat, pouch, elongated, or prismatic outer shape. As depicted in FIG. 2D, for example, a battery cell such as the battery cell 120 may be implemented as a cylindrical cell. In the example of FIG. 2D, the battery cell 120 includes a cell housing 224 having a cylindrical outer shape. For example, the anode 208, the electrolyte 210, and the cathode 212 may be rolled into one or more substantially cylindrical windings 221. As shown, one or more windings 221 of the anode 208, the electrolyte 210, and the cathode 212 may be disposed within the cell housing 224. However, the cylindrical cell implementation of FIG. 2D is merely illustrative, and other implementations of the battery cells 120 are contemplated.

Figure 2E:
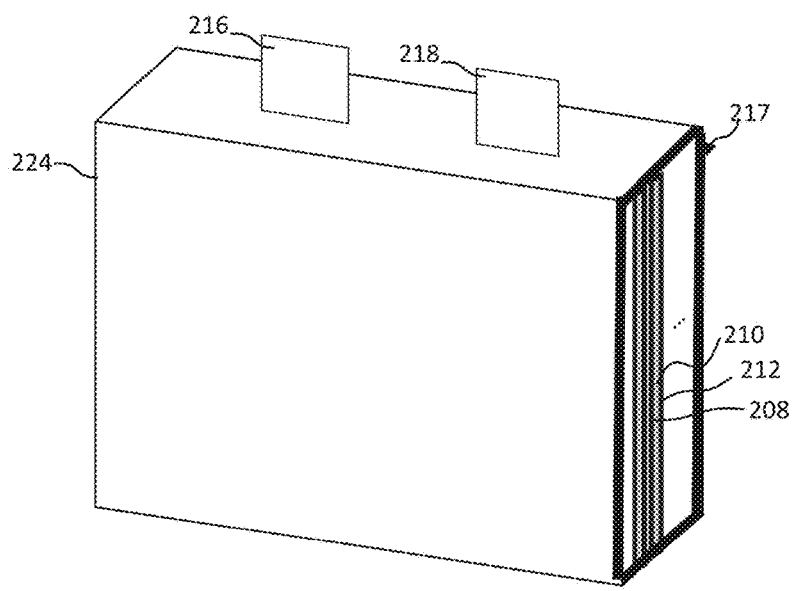
FIG. 2E illustrates a cross-sectional perspective view of a prismatic battery cell in accordance with one or more implementations.

For example, FIG. 2E illustrates an example in which the battery cell 120 is implemented as a prismatic cell. As shown in FIG. 2E, the battery cell 120 may have a cell housing 224 having a right prismatic outer shape. As shown, one or more layers of the anode 208, the cathode 212, and the electrolyte 210 disposed therebetween may be disposed within the cell housing 224 having the right prismatic shape. As examples, multiple layer of the anode 208, electrolyte 210, and cathode 212 can be stacked, or a single layer of the anode 208, electrolyte 210, and cathode 212 can be formed into a flattened spiral shape and provided in the cell housing 224 having the right prismatic shape. In the implementation of FIG. 2E, the cell housing 224 has a relatively thick cross-sectional width 217 and is formed from a rigid material. For example, the cell housing 224 in the implementation of FIG. 2E may be formed from a welded, stamped, deep drawn, and/or impact extruded metal sheet, such as a welded, stamped, deep drawn, and/or impact extruded aluminum sheet. For example, the cross-sectional width 217 of the cell housing 224 of FIG. 2E may be as much as, or more than 1 millimeter (mm) to provide a rigid housing for the prismatic battery cell. In one or more implementations, the first terminal 216 and the second terminal 218 in the prismatic cell implementation of FIG. 2E may be formed from a feedthrough conductor that is insulated from the cell housing 224 (e.g., a glass to metal feedthrough) as the conductor passes through to cell housing 224 to expose the first terminal 216 and the second terminal 218 outside the cell housing 224 (e.g., for contact with an interconnect structure 200 of FIG. 2B). However, this implementation of FIG. 2E is also illustrative and yet other implementations of the battery cell 120 are contemplated.

Figure 2F:
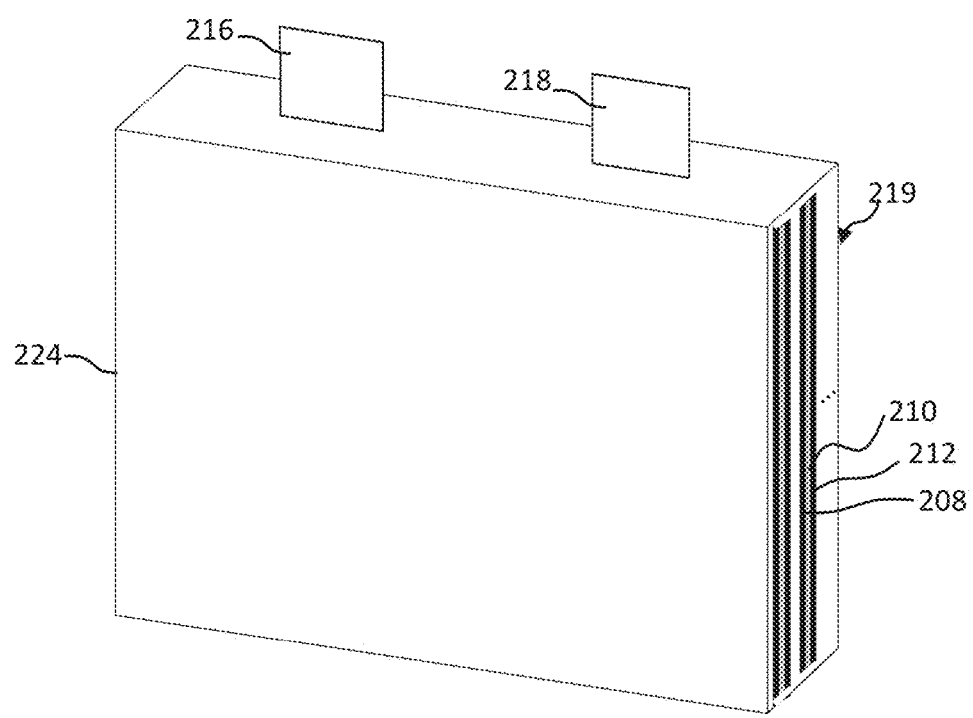
FIG. 2F illustrates a cross-sectional perspective view of a pouch battery cell in accordance with one or more implementations.

For example, FIG. 2F illustrates an example in which the battery cell 120 is implemented as a pouch cell. As shown in FIG. 2F, one or more layers of the anode 208, the cathode 212, and the electrolyte 210 disposed therebetween may be disposed within the cell housing 224 that forms a flexible or malleable pouch housing. In the implementation of FIG. 2F, the cell housing 224 has a relatively thin cross-sectional width 219. For example, the cell housing 224 in the implementation of FIG. 2F may be formed from a flexible or malleable material (e.g., a foil, such as a metal foil, or film, such as an aluminum-coated plastic film). For example, the cross-sectional width 219 of the cell housing 224 of FIG. 2F may be as low as, or less than 0.1 mm, 0.05 mm, 0.02 mm, or 0.01 mm to provide flexible or malleable housing for the pouch battery cell. In one or more implementations, the first terminal 216 and the second terminal 218 in the pouch cell implementation of FIG. 2F may be formed from conductive tabs (e.g., foil tabs) that are coupled (e.g., welded) to the anode 208 and the cathode 212 respectively, and sealed to the pouch that forms the cell housing 224 in these implementations. In the examples of FIGS. 2C, 2E, and 2F, the first terminal 216 and the second terminal 218 are formed on the same side (e.g., a top side) of the battery cell 120. However, this is merely illustrative and, in other implementations, the first terminal 216 and the second terminal 218 may formed on two different sides (e.g., opposing sides, such as a top side and a bottom side) of the battery cell 120. The first terminal 216 and the second terminal 218 may be formed on a same side or difference sides of the cylindrical cell of FIG. 2D in various implementations.

In one or more implementations, a battery module 115, a battery pack 110, a battery unit, or any other battery may include some battery cells 120 that are implemented as solid-state battery cells and other battery cells that are implemented with liquid electrolytes for lithium-ion or other battery cells having liquid electrolytes. One or more of the battery cells 120 may be included a battery module 115 or a battery pack 110, such as to provide an electrical power supply for components of the vehicle 100, the building 180, or any other electrically powered component or device. The cell housing 224 of the battery cell 120 can be disposed in the battery module 115, the battery pack 110, or installed in any of the vehicle 100, the building 180, or any other electrically powered component or device.

Solid State Electrolyte

As discussed above, a battery cell (e.g., battery cell 120) composed of a solid state electrolyte (e.g., electrolyte 210) of the present disclosure can be used to store and discharge electrical energy and implemented in a building and/or moveable apparatus.

All solid-state batteries (ASSBs) that employ a solid electrolyte have improved safety, power density, and energy density compared with batteries that use a liquid electrolyte. However, solid state electrolytes traditionally have inferior ionic conductivity and inferior electrochemical stability compared to liquid electrolytes. Argyrodite sulfide solid electrolytes, such as $Li_6PS_5Cl$ (also written as $Li_{48}P_8S_{40}Cl_8$), have relatively high ionic conductivity (>1 mS cm$^{-1}$ at 25° C.) but are reactive with certain battery cell chemistry.

Aspects of the subject technology described herein relate to a solid-state electrolyte composed of a composition of $Li_6PS_5Cl$ (LPSC composition), which includes a dopant that substitutes, in part, for phosphorus and an excess amount of Cl. As used herein, a phosphorus-site doped (P-site doped or dopant) refers to a LPSC composition have one or more dopants substituted, in part, for phosphorus. For example, the LPSC composition of the present disclosure may include a P-site dopant having an ionic radius greater than phosphorus (P) and selected among Groups 4, 5, 14, or 15 of the periodic table of elements, or any combination thereof. Such P-site dopants include, without limitation: Sn, Si, Zr, Ti, Sb, Bi, V, Nb, Ta, or a combination thereof. The LPSC composition may include an excess amount of Cl, e.g., more than one mole of Cl such as greater than one mole and no more than two moles of Cl.

It is believed that doping and off-stoichiometry causes site disorder which in turn affects Li ion diffusion and ionic conductivity characteristics of the material. Computations and simulations show such doped, off-stoichiometric compositions would exhibit lithium ion diffusivity on the order of that of parent compound $Li_6PS_5Cl$ (LPSC base compound) yet with improved thermodynamic stability relative to $Li_6PS_5Cl$. Such solid state electrolytes can be used in all solid-state batteries and configured for use in electric vehicles.

In some implementations, the subject technology described herein relates to a solid-state electrolyte that includes a composition of Formula (I):

$$Li_xP_{(1-y)}A_yS_{(6-z)}Cl_{1+z} \quad (I).$$

In Formula (I), A is a P-site dopant selected among Group 4, 5, 14, or 15 of the periodic table, or a combination thereof, such as an element selected among Sn, Si, Zr, Ti, Sb, Bi, V, Nb, Ta, or a combination thereof. Further, the variables x, y and z can have ranges of: $4.5<x<7$; $0<y<1$; and $0<z<1$. In certain aspects, $5<x<7$ such as $5<x<6$. In certain aspects, y and z can individually range from $0.25<y<0.75$, $0.25<z<1$, $0.15<y<0.35$, $0.25<z<0.75$.

Example compositions include: (i) where $5<x<6$; $0.15<y<0.35$, $0.25<z<0.75$, A is a Group 5 or 15 dopant, e.g. Bi, such as for example $Li_{5.5}P_{0.75}Bi_{0.25}S_{4.5}Cl_{1.5}$; or (ii) $5<x<6$; $0.25<y<0.75$, $0.25<z<1$, A is a Group 4 or 14 dopant, e.g. Si, such as for example $Li_{5.75}P_{0.75}Si_{0.25}S_{4.5}Cl_{1.5}$ or $Li_{5.5}P_{0.5}Si_{0.5}S_4Cl_2$; or combinations thereof.

The LPSC compositions of the present disclosure, e.g. compounds of Formula (I), can be prepared as powders via solid-state reaction processes. For example, the process can include combining precursors based on lithium, phosphorus, dopant, sulfur and chlorine. The precursors are combined in an amount that yield a composition of Formula (I). After, or while combining the precursors, the combination can be ball-milled to form a powder followed by sintering the powder. In a typical process, green (i.e., un-sintered) powders can be obtained by mixing stoichiometric amounts of reagent grade precursor materials in a zirconia ball-mill pot with zirconia balls under certain weight ratios and milling at around 300-400 rpm for about 1-2 h. Then, the green powders are sintered in a closed quartz crucible at around 500-600° C. for about 6-10 h under protection of inert gas. The finished powders can be sieved through a mesh sieve and collected.

As provided above, the solid-state electrolytes of the present disclosure can be included in a battery cell (e.g., cell 120). In accordance with aspects of the present disclosure, a battery cell can include a solid-state electrolyte comprising a composition of Formula (I). The battery cell can further include a positive electrode having a cathode active material a negative electrode which may have an anode active material or which may form an anode active material in-situ on a current collector, e.g., an anode-free cell. The battery cell can further include a positive and a negative terminal, which may be used to electrically connect a load or charger to the battery cell.

Figure 3:
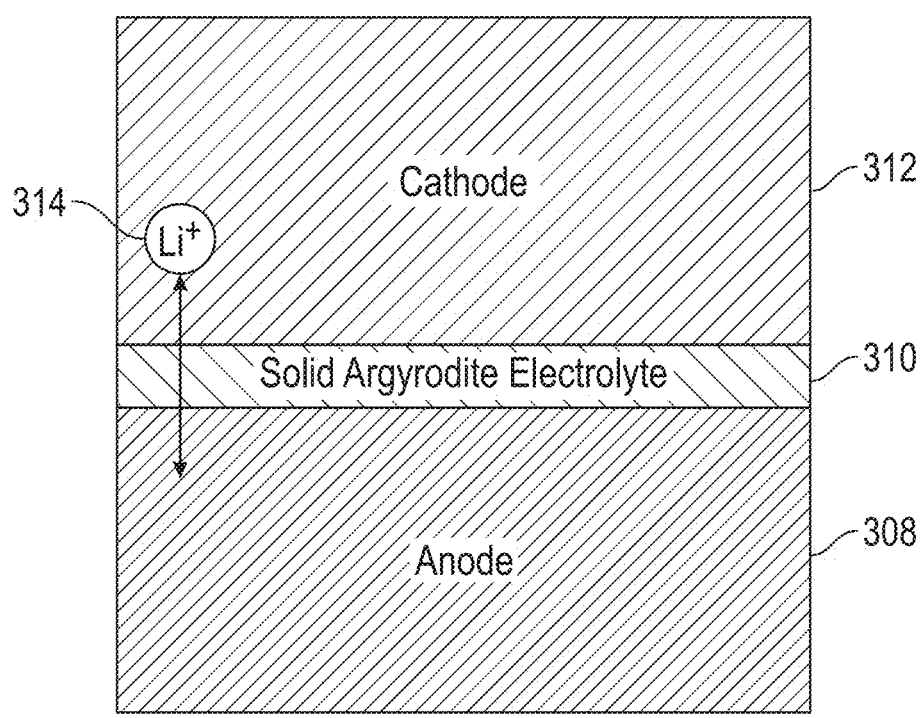
FIG. 3 is a schematic illustration of a battery cell including a solid-state electrolyte between a positive electrode and a negative electrode and showing lithium ions shuttling between the positive and negative electrodes.

FIG. 3 illustrates a layered arrangement of a solid-state battery cell. In particular, the figure shows solid-state electrolyte of the present disclosure (310) between and separating a cathode 312 and an anode 308. As illustrated in FIG. 3, the ionic conductivity of the solid state electrolyte 310 allows lithium ions (314) to reversibly shuttle between the cathode (312) and anode (308) during discharge and charging of the cell.

In some aspects, a battery cell may include a positive electrode including a cathode active material. Such cathode active materials can be composed of, without limitation: one or more metal oxides (e.g., a lithium cobalt oxide, a lithium manganese oxide, a lithium nickel manganese cobalt oxide (NMC), or the like) and/or a lithium metal phosphate, such as a lithium iron phosphate, lithium manganese phosphate, etc. or combinations thereof. The battery cell may include a negative electrode including an anode active material, which can be composed of, without limitation: graphitic carbon (e.g., ordered or disordered carbon with sp$^2$ hybridization, artificial or natural graphite, or blends thereof), lithium metal, lithium alloys such as Li—Mg, Li—Al, Li—Ag alloys, a metal oxide, e.g., lithium titanate, silicon, a silicon-based material (e.g., silicon-based carbon composite, oxide, carbide, a pre-lithiated silicon material), etc. or a combination of any two or more thereof.

In some aspects, anodes that can be included in a battery cell in accordance with the present disclosure include an anode that can be formed in situ on a current collector. For example, an electrode can include a current collector (e.g., a metal foil such as a copper foil or carbon foil) with an in situ-formed anode (e.g., Li metal) on a surface of the current collector facing the solid-state electrolyte. In such examples, a battery cell can be configured to lack an anode active material in an uncharged state.

In accordance with aspects of the subject technology, a method of manufacturing a battery is provided. The method includes: providing a solid-state electrolyte of the present disclosure between a positive electrode and a negative electrode.

In accordance with aspects of the subject technology, a method is provided to charge and/or discharge a battery. The method includes: obtaining a battery having a cell (e.g., a battery cell 120), the cell including a cathode (e.g., cathode 212), an anode (e.g., anode 208), and a solid-state electrolyte (e.g., solid-state electrolyte 210), the electrolyte including a composition of $Li_6PS_5Cl$, which includes a P-site dopant and an excess amount of Cl. The method further including charging the cell of the battery, and/or discharging the cell of the battery. Discharging the cell can provide electrical power to a power-consuming component (e.g., a vehicle and/or an electrical system of a building).

EXAMPLES

The following examples of solid-state electrolytes are intended to further illustrate certain aspects of the subject technology and are not limiting in nature. Those skilled in the art will recognize, or be able to ascertain, using no more than routine experimentation, numerous equivalents to the specific substances and procedures described herein.

General. High fidelity ab-initio molecular dynamics (MD) simulations were used to compute Li diffusivity and other performance related properties of interest of various argyrodite compositions. Structural and elemental features were extracted from Crystallographic Information File (CIF) (structure) files of the studied argyrodite compositions using the matminer package in Python. The extracted features were used to establish structure-performance relations, which were utilized to down-select argyrodite compositions having certain performance related properties as SSE An initial step included computing the performance related properties for various off-stoichiometry and doped compositions of argyrodite using AB-initio MD simulations. The simulation computed diffusivity, energy-above hull, oxidation and reduction potentials of 60 different argyrodite compositions. The compositions were selected to include a large number of possible doping, replacement and off-stoichiometry scenarios in the argyrodite structure for the dataset. For example, compositions representing each of Li, P, S, and Cl-sites in the base argyrodite LPSC structure (written as $Li_6PS_5Cl$ or $Li_{48}P_8S_{40}Cl_8$) being doped, replaced and/or being in excess amount.

Next, a python-based materials featurizer, called Matminer, was used to extract features for all the compositions in the dataset. Matminer is a python library that helps to apply data-driven techniques to materials science. It performs three primary tasks, data retrieval, feature representation, and visualization. In our study, we mainly used the feature representation module of matminer. The Matminer featurizer use the CIF (Structure) files of the argyrodite compositions to compute fixed-length vectors of physical and physicochemical features representing the effect of doping/off-stoichiometry on the structure. A small subset of matminer descriptors/features were used in our work. It included 24 types of features broadly categorized into six sub-modules based on: 1) Elemental composition, 2) Total sites occupied by the base elements (Li, P, S and Cl), 3) Jarvis cell properties, 4) Cell density 5) Atomic bonding and 6) Co-ordination number of the base elements. The list of features is provided in Table 1 below. The 'elemental composition' and 'total site number' related features describe what element is doped and at which site, whereas the other cell, density, bonding and co-ordination number related features helps to understand the effect of doping/off-stoichiometry on the argyrodite structure and thereby on the Li distribution and it's hopping pathways. The matminer features were used to establish structure-performance correlations and the effect of various site doping/off-stoichiometry on the argyrodite structure and thereby the expected performance of the compositions.

TABLE 1

Performance descriptors and Matminer features studied in this work

| Modules | Matminer Feature Names |
|---|---|
| Computed Performance related Properties | diffusion Coefficient (mS/cm) oxidation_potential_li (V) reduction_potential_li (V) energy above Hull (eV/atom) |
| Elemental Features | atomic number (mean) molar_volume (mean) atomic_mass (mean) atomic_radius (mean) boiling_point (mean) melting_point (mean) electronegativity (mean) |
| Site Number | Total_Li_sites Total_S_sites Total_P_sites Total_Cl_sites |
| Jarvis Cell Features | jml_pack_frac jml_density jml_log_volume_per_atom |
| Density Features | max packing efficiency density volume_per_atom packing fraction |
| Bonding Features | mean_of_minimum_relative dist_for_all_element std_of_minimum_relative dist_for all_element |
| Coordination Number | mean_Li_CN mean_S_CN mean_P_CN mean_Cl_CN |

A correlation heatmap was plotted between all the matminer features and the computed properties to determine the set of features that have the highest correlation with the diffusivity, oxidation and reduction potentials in argyrodites. The Pearson correlation coefficient (r) was utilized in this process as it has been extensively used in determining the relative importance of features. This coefficient can be calculated as shown in equation (1):

$$r = \frac{\sum (xi - \bar{x})(yi - \bar{y})}{\sqrt{\sum (xi - \bar{x})^2 (yi - \bar{y})^2}}. \quad (1)$$

In equation (1), r is the correlation coefficient; xi are the values of the x-variable in a sample; $\bar{x}$ is the mean of the values of the x-variable; yi are the values of the y-variable in a sample; $\bar{y}$ is the mean of the values of the y-variable.

Figure 4:
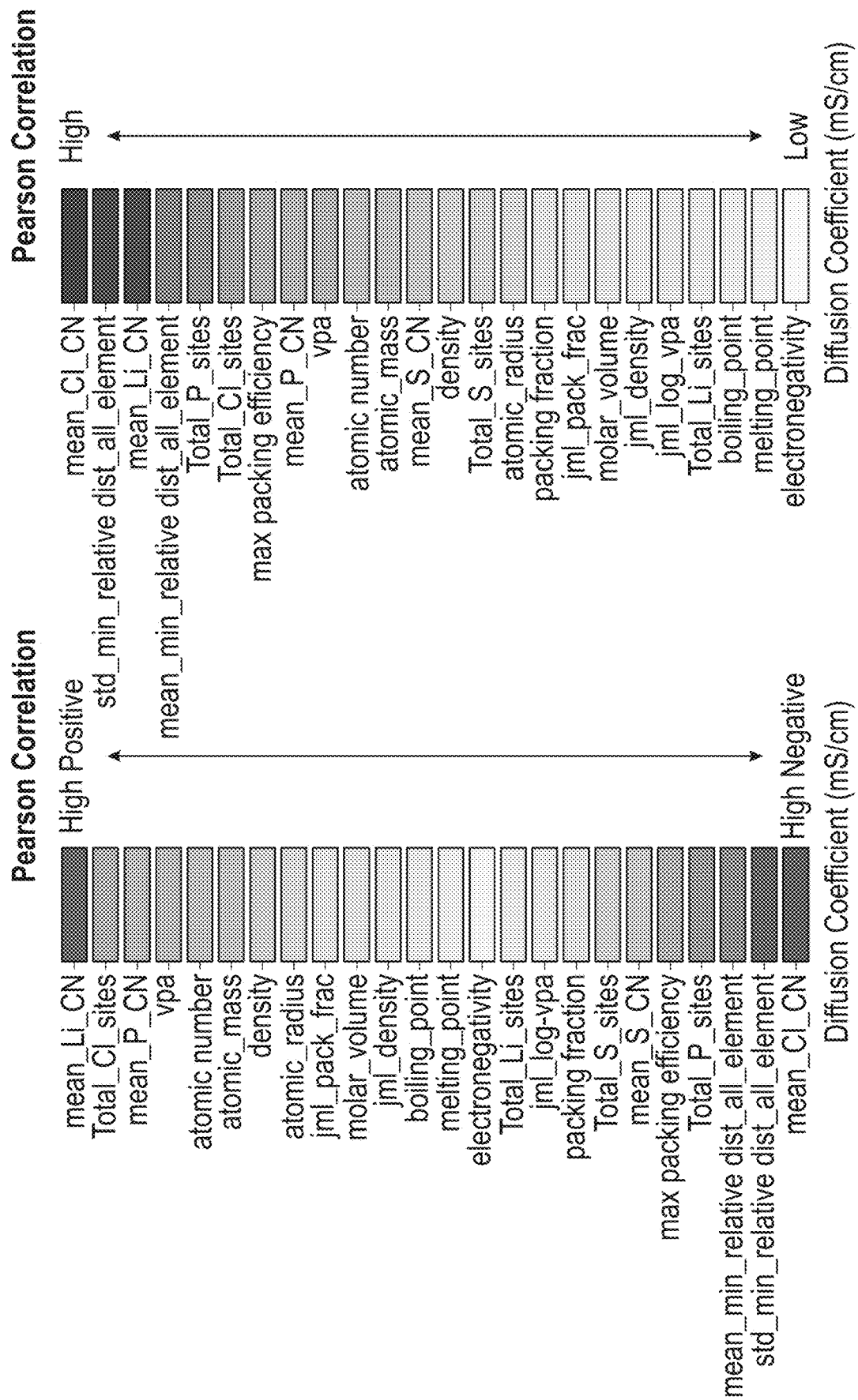
FIG. 4 is a table showing features of LPSC compositions that have the highest correlation with the diffusivity values.

The features that have the highest correlation with the diffusivity values are listed in FIG. 4. At the top of the list, are various structural features related to a Li and Cl coordination number, along with other features like minimum relative distance of each atom to its nearest neighbors, packing efficiency and volume per atom. These features, according to the pearson correlation coefficient analysis, are the features that are mostly correlated to the Li hopping pathway and thereby diffusivity in the argyrodite structure. Among the elemental features we see 'Total P sites' and 'Total Cl sites' are highly correlated to diffusivity. Evidently from FIG. 4 'Total Cl sites' has a high positive correlation and 'Total P sites' has a high negative correlation to diffusivity, meaning that doping P site or using excess Cl in argyrodites influences the structural features in a way that facilitate Li diffusion in the structure. This is also validated by the diffusivity results in our dataset. The top two compositions with highest diffusivity values in our dataset ($Li_{5.5}PS_{4.5}Cl_{1.5}$ with excess Cl and P-site doped $Li_6P_{0.25}Bi_{0.75}S_5Cl$) are listed in Table 2. Table 2 also lists the structural features of these compositions which according to the Pearson Coefficient analysis are highly correlated to diffusivity. Comparing them with similar features of the base $Li_6PS_5Cl$ structure allows a better understanding of doping 'which' site 'how' influences the diffusivity in the argyrodite structure.

TABLE 2

Comparing features of compositions with high Li diffusivity with the base $Li_6PS_5Cl$ composition.

| | $Li_6PS_5Cl$ (Base LPSC) | $Li_6P_{0.25}Bi_{0.75}S_5Cl$ | $Li_{5.5}PS_{4.5}Cl_{1.5}$ |
|---|---|---|---|
| Diffusion Coefficient (mS/cm) | 94.69 | 725.98 | 792.68 |
| mean Li CN | 3 | 3.66 | 3.55 |
| mean Cl CN | 12 | 4.0 | 3.66 |
| Atomic radius | 1.20 | 1.23 | 1.19 |
| Electronegativity | 1.85 | 1.85 | 1.91 |
| Volume per atom | 20.49 | 21.03 | 20.54 |
| Min. relative dist. elements (mean) | 0.89 | 0.86 | 0.87 |
| Min. relative dist. (std) | 0.11 | 0.03 | 0.03 |
| Features Impacted | | Cell Volume Mean Li CN Mean Cl CN Min. relative dist. | Li site vacancy Mean Li CN Mean Cl CN Min. relative dist. |

From Table 2, it is evident that using excess Cl creates Li vacancy and influences other structural features in a way that facilitate diffusivity. Likewise, for P-site doping, we notice that doping with an element with higher ionic radius than P (Here Bi=230 pm vs P=195 pm) creates more space/volume in the cell in a way that helps Li hopping in the structure. We thus concluded both P-site doping and using excess Cl have a positive impact on Li diffusivity. These effects are observed on two different sites in the argyrodite structure, i.e., double doped/off-stoichiometric argyrodite compositions where, P site is doped with a Group IV or Group V element (with higher ionic radius than P) for generating structural space and also excess Cl is used for creating Li vacancies to facilitate Li hopping. Compositions with such features are thus disclosed as solid state electrolytes in the present disclosure. Such solid-state electrolytes combine the positive effects of both P-site doping and using excess-Cl and are expected to have high Li diffusivity compared to the base LPSC composition. Based on our analysis, solid-state electrolytes can include compositions set out in Formula (I) below:

$$Li_xP_{(1-y)}A_yS_{(6-z)}Cl_{1+z} \quad (I)$$

wherein A is a P-site dopant selected among Group 4, 5, 14, or 15 of the periodic table of elements, or any combination thereof. Such P-site dopants include, for example, Sn, Si, Zr, Ti, Sb, Bi, V, Nb, Ta, or a combination thereof. Further, in Formula (I), the variables x, y and z can have a range of: $4.5<x<7$, $0<y<1$, and $0<z<1$. In certain aspects, y and z can range from $0.25<y<0.75$, and $0.25<z<1$.

Example compositions include: (i) where $5<x<6$; $0.25<y<0.75$, $0.25<z<1$, A is a Group 4 or 14 dopant, e.g. Si, such as for example $Li_{5.5}P_{0.5}Si_{0.5}S_4Cl_2$; or (ii) where $5<x<6$; $0.15<y<0.35$, $0.25<z<0.75$, A is a Group 5 or 15 dopant, e.g. Bi, such as for example $Li_{5.5}P_{0.75}Bi_{0.25}S_{4.5}Cl_{1.5}$; or a combination thereof.

Figure 5:
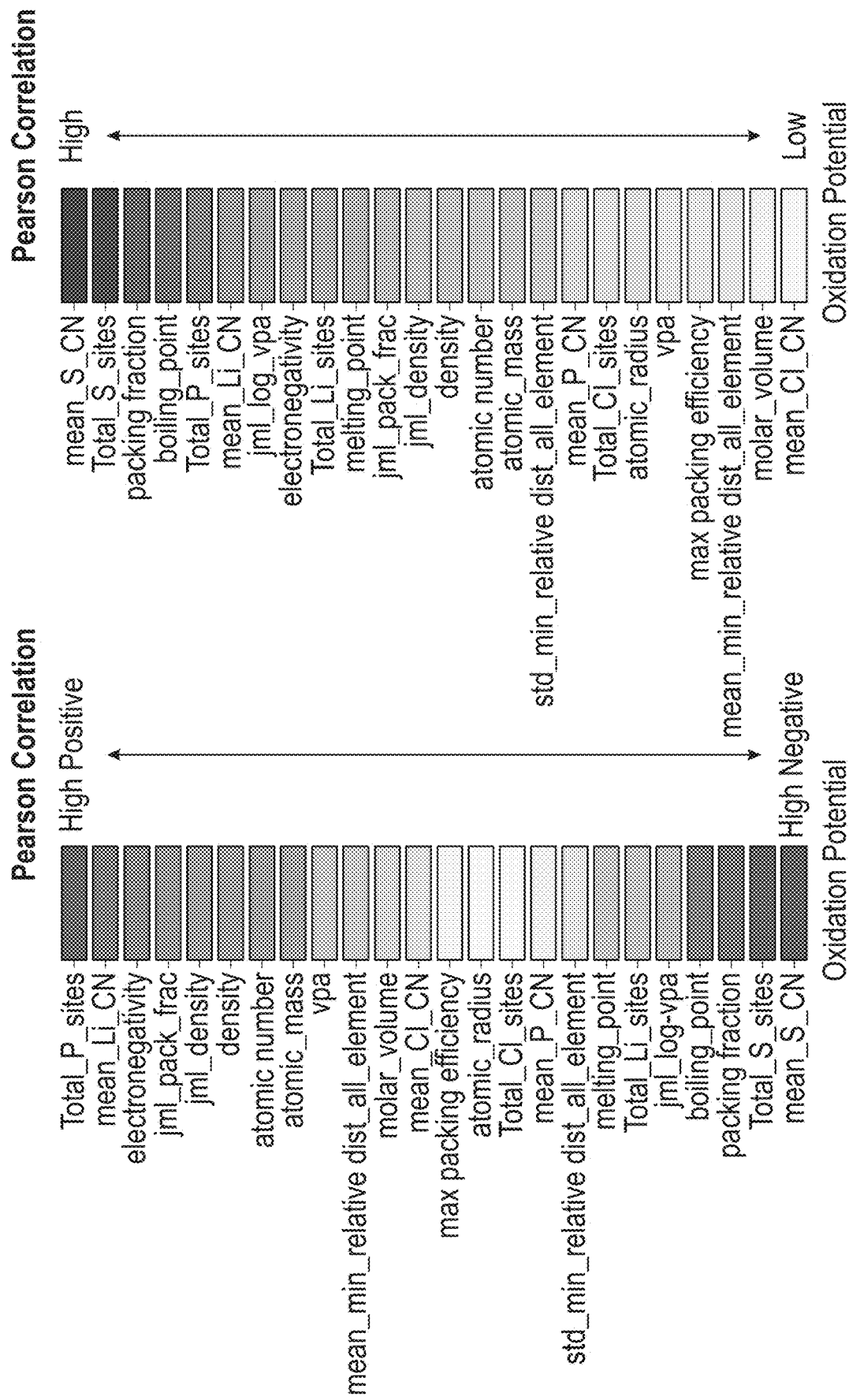
FIG. 5 is a table illustrating features of LPSC compositions features having the highest correlation with oxidation potentials.
Figure 6:
FIG. 6 is a table illustrating features of LPSC compositions features having the highest correlation with reduction potentials.

Diffusivity or ionic conductivity alone may not be insufficient to evaluate solid-state electrolytes, however. Additional properties such as electrochemical window/stability, as well as chemical passivation are also factors that can lead to good cell performance. So, we also analyzed the features having the highest correlation with the oxidation and reduction potentials (see FIGS. 5 and 6) to understand the electrochemical performance of our top-tier candidates. In FIG. 5, we see "Total S sites" has a negative correlation to oxidation potential, meaning that if we can replace some of the S-sites in the base argyrodite structure that would help in improving the oxidation potential. S-site replacement can either be achieved by S-site doping or by using excess Cl which would replace some 'S' atoms in the structure. Since S-doping is believed to have a negative impact on diffusivity, an approach of replacing 'S' in argyrodite compositions would be to use excess Cl. We further notice in FIG. 5 that 'Total P-site' also has a correlation to oxidation potential, though not as prominent as 'Total S-site'. Although, according to FIG. 5, P-site doping/replacement has a negative impact on oxidation structure, but in our solid-state electrolyte compositions (double doped/off-stoichiometric argyrodite compositions with high diffusivity) this would be cancelled out by the more prominent positive impact of S-site replacement using excess Cl. Nonetheless, according to the correlations in FIG. 6, P-site doping facilitates reducing the reduction potential compared to the base LPSC composition. So overall, the solid-state electrolyte compositions of the present disclosure, which have P-site doping and excess Cl, along with high diffusivity, may further have extended electrochemical window/stability (high oxidation potential and low reduction potential) compared to the base $Li_6PS_5Cl$ composition.

Finally, we also compared the chemical stability of the Example solid-state electrolyte compositions of the present disclosure (double doped/off-stoichiometric argyrodite compositions) with commonly used electrode materials vs the base $Li_6PS_5Cl$ composition.

Figure 7:
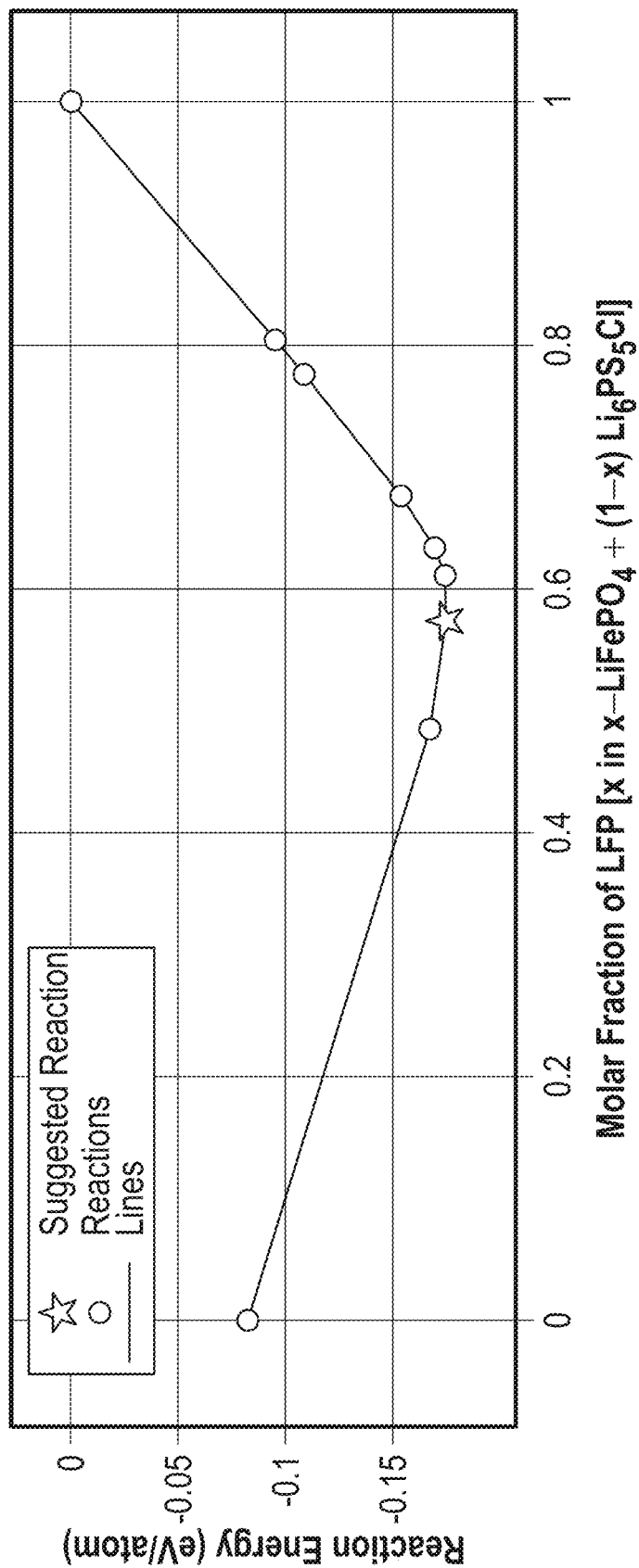
FIG. 7 is a plot of reaction energy versus mole fraction of LFP for reaction between $Li_6PS_5Cl$ and LFP.

To compute whether the Example solid-state electrolyte compositions of the present disclosure exhibit equilibrium with the electrode materials, the convex hull method is applied using data from materialproject.org (materialproject.org is an open access materials database that is open to public and contains DFT calculated properties of more than 500,000 inorganic materials). For each exemplary compound, the convex hull is calculated for the set of elements defined by the compound plus the electrode material. Within this convex hull, tie line connecting the candidate compound with the electrode material is sought. The presence of such a tie line indicates that the exemplary compound exhibits stable equilibrium with the electrode. The absence of such a tie line indicates that the candidate compound does not exhibit stable equilibrium with the electrode but rather reacts. FIG. 7 shows the case study of using the base $Li_6PS_5Cl$ with LFP ($LiFePO_4$) as the cathode active material. The base LPSC ($Li_6PS_5Cl$) will react with the LFP cathode, where the most energetically favorable chemical reaction is as follow: 0.255 $Li_6PS_5Cl$+0.745 $LiFePO_4 \rightarrow$ 0.447 $Li_3PO_4$+0.213$FePS$+0.17 $Li_4P_2O_7$+0.532 $FeS_2$+0.255 LiCl with $E_{rxn}$ of −0.175 eV/atom.

LPSC being the base argyrodite composition, we evaluated the stability of exemplary solid state electrolyte compositions of the present disclosure with $LiFePO_4$ (LFP) against base LPSC. Tables 3 and 4 below provide data relating to chemical stability of two exemplary solid state electrolyte compositions of the present disclosure (Example 1 and Example 2). Table 3 below shows chemical stability of two exemplary solid state electrolyte compositions of the present disclosure compared to base $Li_6PS_5Cl$ against a cathode active material of LFP ($LiFePO_4$).

sure vs. the base $Li_6PS_5Cl$ composition to evaluate their chemical performance in the cell. For example, $Li_{5.5}P_{0.5}Si_{0.5}S_4Cl_2$=2.333, and therefore 2.333/2.922=0.850 in the 'Ratio vs LPSC' column. For LFP reaction, it is beneficial if the "Ratio" value of the coating is less compared to LFP-LPSC reaction ratio (i.e., the solid state

TABLE 3

| Material | A | Reaction with LFP | B | C | D | E | F |
|---|---|---|---|---|---|---|---|
| $Li_6PS_5Cl$ | 268.39 | 0.255 $Li_6PS_5Cl$ + 0.745 $LiFePO_4$ → 0.447 $Li_3PO_4$ + 0.213 FePS + 0.17 $Li_4P_2O_7$ + 0.532 $FeS_2$ + 0.255 LiCl | 2.922 | 1 | −0.175 | 1 | 100.00 |
| Example 1 $Li_{5.5}P_{0.5}Si_{0.5}S_4Cl_2$ | 266.84 | 0.3 $Li_{5.5}P_{0.5}Si_{0.5}S_4Cl_2$ + 0.7 $LiFePO_4$ → 0.1 $Li_4P_2O_7$ + 0.2 FePS + 0.5 $FeS_2$ + 0.15 $SiO_2$ + 0.6 LiCl + 0.45 $Li_3PO_4$ | 2.333 | 0.850 | −0.143 | 0.817 | 119.28 |
| Example 2 $Li_{5.5}P_{0.75}Bi_{0.25}S_{4.5}Cl_{1.5}$ | 311.12 | 0.703 $LiFePO_4$ + 0.297 $Li_{5.5}P_{0.75}Bi_{0.25}S_{4.5}Cl_{1.5}$ → 0.18 FePS + 0.037 $Bi_2S_3$ + 0.173 $Li_4P_2O_7$ + 0.523 $FeS_2$ + 0.399 $Li_3PO_4$ + 0.446 LiCl | 2.367 | 0.810 | −0.136 | 0.777 | 147.50 |

A. Formula Weight, B. Ratio, C. Ratio vs LPSC, D. $E_{rxn}$ (ev/atom), E. $E_{rxn}$ VS LPSC, F. LFP Stability Score Table 4 below shows chemical stability of two exemplary solid state electrolyte compositions of the present disclosure compared to base $Li_6PS_5Cl$ against Li metal.

electrolyte consumes less LFP). Similarly, it is desired for $E_{rxn}$ of LFP vs doped/off-stoichiometric compositions to be higher (i.e., less favorable to react with LFP) compared to

TABLE 4

| Material | A. | Reaction with Li | B | C | D | E | F |
|---|---|---|---|---|---|---|---|
| $Li_6PS_5Cl$ | 268.39 | 0.111 $Li_6PS_5Cl$ + 0.889 Li → 0.111 $Li_3P$ + 0.111 LiCl + 0.556 $Li_3P$ | 8.009 | 1 | −0.592 | 1 | 100.0 |
| Example 1 $Li_{5.5}P_{0.5}Si_{0.5}S_4Cl_2$ | 266.84 | 0.857 Li + 0.143 $Li_{5.5}P.5Si_{0.5}S_4Cl_2$ → 0.071 $Li_3P$ + 0286 LiCl + 0.571 $Li_2S$ + 0.071 Si | 5.993 | 0.776 | −0.465 | 0.785 | 127.38 |
| Example 2 $Li_{5.5}P_{0.75}Bi_{0.25}S_{4.5}Cl_{1.5}$ | 311.12 | 0.889 Li + 0.111 $Li_{5.5}P_{0.75}Bi_{0.25}S_{4.5}Cl_{1.5}$ → 0.028 $Li_3Bi$ + 0.083 $Li_3P$ + 0.167 LiCl + 0.5 $Li_2S$ | 8.009 | 1.00 | −0.554 | 0.936 | 119.72 |

A. Formula Weight, B. Ratio, C. Ratio vs LPSC, D. $E_{rxn}$ (ev/atom), E. $E_{rxn}$ VS LPSC, F. Li metal Stability Score The solid-state electrolyte compositions of the present disclosure can have better chemical equilibrium with LFP than the base LPSC composition. For example, as shown in Table 3 above, 0.255 $Li_6PS_5Cl$ reacts with 0.745 $LiFePO_4$ to form 0.447 $Li_3PO_4$+0.213FePS+0.17 $Li_4P_2O_7$+0.532 $FeS_2$+ 0.255 LiCl with $E_{rxn}$ of −0.175 eV/atom. The ratio between LFP to LPSC is 0.745/0.255=2.922 for this reaction. In Table 3, we have shown the 'LFP stability performance' of two examples solid state electrolytes of the present disclo- LFP vs base LPSC reaction. We have compared $E_{rxn}$ of the example compositions vs. LPSC in the '$E_{rxn}$ vs LPSC' column. We then added the two values that are referenced to LPSC for molar ratio and reaction enthalpy. Since these values are evaluated based on the molar fraction, we then convert this value by dividing by molecular weight: e.g., 2.00/268.39×1,000=7.45 for the base $Li_6PS_5Cl$. In the last column ('LFP-Stability-Score'), we provide the percentage improvement vs. base LPSC or the LFP stability score for the doped/off-stoichiometric compositions of interest: i.e., 7.45/6.247×100=119.28% for $Li_{5.5}P_{0.5}Si_{0.5}S_4Cl_2$. Anything above 100% means better performance than the base $Li_6PS_5Cl$ composition. In both cases, we see that the example solid state compositions of the present disclosure have better stability with LFP cathodes than the base LPSC composition.

Likewise, the chemical stability of the example double doped/off-stoichiometry argyrodite compositions of the present disclosure against Li metal anode is shown in Table 4. And again, Table 4 shows that the example solid state compositions of the present disclosure have better stability with Li than the base $Li_6PS_5Cl$ composition.

Battery cells having solid state electrolytes of the present disclosure can improved safety, power density, and energy density compared with batteries that use a liquid electrolyte. Such all solid state batteries enhance efficiency and utilization of batteries, which can help to mitigate climate change by reducing and/or preventing additional greenhouse gas emissions. In particular, such solid state electrolytes can be used in all solid-state batteries and configured for use in electric vehicles.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, the term "coupled" or the like may refer to being directly coupled. In another aspect, the term "coupled" or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for".

Those of skill in the art would appreciate that the various illustrative blocks, modules, elements, components, methods, and algorithms described herein may be implemented as hardware, electronic hardware, computer software, or combinations thereof. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A solid-state electrolyte, comprising a composition of: $Li_{5.5}P_{0.75}Bi_{0.25}S_{4.5}Cl_{1.5}$, $Li_{5.5}P_{0.5}Si_{0.5}S_4Cl_2$, $Li_{5.75}P_{0.75}Si_{0.25}S_{4.5}Cl_{1.5}$, or a combination thereof.

2. A battery cell, comprising:
a solid-state electrolyte comprising
a composition of $Li_{5.5}P_{0.75}Bi_{0.25}S_{4.5}Cl_{1.5}$, $Li_{5.5}P_{0.5}Si_{0.5}S_4Cl_2$, $Li_{5.75}P_{0.75}Si_{0.25}S_{4.5}Cl_{1.5}$, or a combination thereof.

3. The battery cell of claim 2, further comprising a positive electrode that comprises a cathode active material including a lithium metal oxide, a lithium metal phosphate, or a combination thereof.

4. The battery cell of claim 2, further comprising a negative electrode that comprises an anode active material including lithium metal, a lithium metal alloy, a metal oxide, silicon, a silicon-based material, a carbonaceous material, or a combination thereof.

5. The battery cell of claim 2, further comprising a negative electrode that comprises a current collector and lithium metal formed thereon in-situ.

6. The battery cell of claim 2,
further comprising a positive electrode that comprises a cathode active material including a lithium metal oxide, a lithium metal phosphate, or a combination thereof; and a negative electrode that comprises an anode active material including lithium metal, a lithium metal alloy, or a combination thereof.

7. The battery cell of claim 2, further comprising a positive electrode that comprises a cathode active material including a lithium metal phosphate; and a negative electrode that comprises an anode active material including lithium metal, a lithium metal alloy, or a combination thereof.

8. A vehicle comprising a battery cell that comprises a solid-state electrolyte comprising a composition of $Li_{5.5}P_{0.75}Bi_{0.25}S_{4.5}Cl_{1.5}$, $Li_{5.5}P_{0.5}Si_{0.5}S_4Cl_2$, $Li_{5.75}P_{0.75}Si_{0.25}S_{4.5}Cl_{1.5}$, or a combination thereof.

* * * * *